(12) United States Patent
Na et al.

(10) Patent No.: US 7,991,083 B2
(45) Date of Patent: Aug. 2, 2011

(54) METHOD AND SYSTEM FOR DETECTING PREAMBLES IN A MULTI-CELL SYSTEM

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1281 days.

(21) Appl. No.: 11/605,600

(22) Filed: Nov. 28, 2006

(65) Prior Publication Data

US 2007/0297540 A1    Dec. 27, 2007

Related U.S. Application Data

(60) Provisional application No. 60/815,661, filed on Jun. 22, 2006.

(51) Int. Cl.
*H04L 27/06* (2006.01)

(52) U.S. Cl. ........ 375/342; 375/343; 375/355; 375/365; 375/367; 375/142

(58) Field of Classification Search .......... 374/355, 374/342, 343, 365, 367, 142; 375/355, 342, 375/343, 365, 367, 142
See application file for complete search history.

(56) References Cited

U.S. PATENT DOCUMENTS

| | | | |
|---|---|---|---|
| 5,129,066 A * | 7/1992 | Schmookler | 712/224 |
| 5,533,062 A * | 7/1996 | Liberti et al. | 375/334 |
| 5,943,375 A * | 8/1999 | Veintimilla | 375/355 |
| 6,049,577 A | 4/2000 | Gothe et al. | |
| 6,229,998 B1 * | 5/2001 | Hamdy et al. | 455/226.1 |
| 6,493,376 B1 * | 12/2002 | Harms et al. | 375/130 |
| 2001/0036235 A1 | 11/2001 | Kadous | |
| 2002/0181617 A1 * | 12/2002 | Carleton | 375/316 |
| 2004/0005022 A1 * | 1/2004 | Zhu et al. | 375/365 |
| 2005/0033146 A1 | 2/2005 | Troyansky et al. | |
| 2005/0041761 A1 | 2/2005 | Chen et al. | |
| 2005/0111522 A1 * | 5/2005 | Sung et al. | 375/145 |
| 2005/0163196 A1 | 7/2005 | Currivan et al. | |
| 2005/0272433 A1 * | 12/2005 | Won et al. | 455/449 |
| 2005/0287978 A1 | 12/2005 | Maltsev et al. | |
| 2006/0050799 A1 | 3/2006 | Hou et al. | |
| 2006/0062196 A1 * | 3/2006 | Cai et al. | 370/345 |
| 2006/0078040 A1 * | 4/2006 | Sung et al. | 375/140 |
| 2006/0126766 A1 | 6/2006 | Kang et al. | |
| 2007/0230590 A1 * | 10/2007 | Choi et al. | 375/260 |
| 2007/0237113 A1 * | 10/2007 | Akita et al. | 370/331 |

OTHER PUBLICATIONS

PCT International Search Report and Written Opinion of the International Searching Authority, Feb. 26, 2008.

* cited by examiner

*Primary Examiner* — Shuwang Liu
*Assistant Examiner* — Sung Ahn

(57) ABSTRACT

A method and system is provided for detecting preambles in a multi-cell communication system. The method detects preambles reliably even in the presence of interference caused by multiple cells reusing the same frequency in the multi-cell communication system. After receiving a signal in the receiving period, the time domain signal is sampled and transformed into the frequency domain vector. The correlation vector is calculated with the frequency domain vector and pseudonoise code of the wireless station. The presence of a preamble is verified if the value in the correlation vector exceeds a predetermined threshold.

16 Claims, 5 Drawing Sheets

METHOD AND SYSTEM FOR DETECTING PREAMBLES IN A MULTI-CELL SYSTEM

CROSS REFERENCE

The present application claims the benefit of U.S. Provisional Application Ser. 60/815,661, which was filed on Jun. 22, 2006.

BACKGROUND

In wireless communications, a preamble is a signal that is broadcasted by a base transceiver station (BTS) to all mobile stations (MSs) for facilitating carrier and timing acquisitions. A preamble consists of a bit-sequence called the pseudonoise (PN) code. The PN code is a pseudo-random sequence of 1's and 0's. The cross-correlation and the autocorrelation of the PN codes are similar to those of white noise. Preamble detection is an essential function of a wireless station for detecting incoming signals, as the presence of a preamble with a unique sequence is indicative of an incoming signal. Here, it is generally understood that a wireless station refers to either a mobile terminal or a fixed terminal such as a BTS.

A receiver chain of a wireless station employs a preamble detection module, e.g., a correlator, to detect preamble. If there is a preamble in a receiving signal, the correlator will produce an output the magnitude of which is larger than a predetermined threshold.

In a multi-cell wireless communication system, for example, a cellular system, it is desirable to use the same frequencies repeatedly across the cellular system. The reuse of frequencies enables the wireless communication system with a limited number of radio channels to accommodate a large number of subscribers.

In such a multi-cell wireless communication system, the tolerance to interference determines the frequency reuse factor, defined as the number of distinctive frequencies per cluster of cells-adjacent to each other. Subsequently, the frequency reuse factor determines the efficiency of spectrum usage. The frequency reuse factor is positively related to the carrier to interference ratio (C/I) and negatively related to the spectrum utilization rate.

For example, if the frequency reuse factor is 3, the efficiency of spectrum usage is reduced by a factor of 3. Ideally, if all cells in a cluster use the same frequency, the frequency reuse factor would be 1. Increasing the utilization rate of the spectrum comes with a price. If the frequency reuse factor is 1, the signals from one or more BTSs or customer premise equipment (CPEs) in one cell could spill over to the adjacent cells and cause interference.

The multi-cell interference caused by frequency reuse is one of the major factors that impair the performance of a wireless communication system. The effect of multi-cell interference can be reduced by employing the beamforming method in a unicast communication, but not in broadcast or multicast communications. Preambles are broadcasted by a BTS to all the MS in a wireless communication system. Therefore, a need has arisen for an improved method and system for detecting preambles in the multi-cell communication system.

SUMMARY

The construction and method of operation of the techniques described herein, together with additional objects and advantages thereof, will be best understood from the following description of specific embodiments when read in connection with the accompanying drawings.

The present disclosure teaches a method and system for detecting preambles in a multi-cell communication system. The method detects preambles reliably even in the presence of interference caused by multiple cells reusing the same frequency in the multi-cell communication system. After receiving a signal in the receiving period, the time domain signal is sampled and transformed into the frequency domain vector. The correlation vector is calculated with the frequency domain vector and pseudonoise code of the wireless station according to the techniques described herein. The presence of a preamble is verified if the value in the correlation vector exceeds a predetermined threshold.

BRIEF DESCRIPTION OF THE DRAWING

The drawings accompanying and forming part of this specification are included to depict certain aspects of the techniques described herein. The techniques described herein may be better understood by reference to one or more of these drawings in combination with the description presented herein. It should be noted that the features illustrated in the drawings are not necessarily drawn to scale.

DESCRIPTION

The following detailed description of the techniques used herein refer to the accompanying drawings. The description includes example embodiments, not excluding other embodiments, and changes may be made to the embodiments described herein. The following detailed description is not intended to be limiting.

The present disclosure teaches a novel method for detecting a preamble of an incoming signal in a multi-cell wireless communication system. The method and system determine the integer part of carrier frequency offset and coarse timing position of the preamble. One embodiment is used in an Orthogonal Frequency Division Multiplex Access system with a frequency reuse factor of 1.

An effective reuse pattern W refers to a situation in which all the W cells in a multi-cell communication system have the same center frequency but each cell uses a non-overlapping segment of the frequency band when transmitting the preambles. In other words, an effective reuse pattern W is virtually the same as having W different frequency bands.

In a conventional multi-cell system, each cell is configured as a hexagon. i.e, there are six cells adjacent to the center cell. FIG. 1 is an exemplary cell configuration in a multi-cell communication system with a frequency reuse factor equal to 1 and a reuse pattern equal to three. The BTSs in the three adjacent cells have the same center frequency but each of them uses a non-overlapping segment of the frequency band when a preamble is transmitted.

Figure 1A:
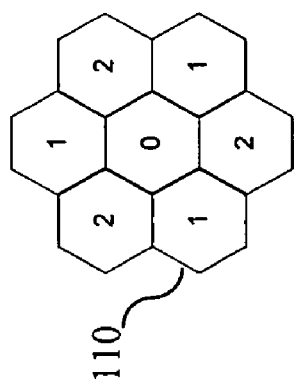
FIGS. 1A and 1B are exemplary cell configurations in spatial and frequency domains, respectively, in a multi-cell wireless communication system.
Figure 1B:
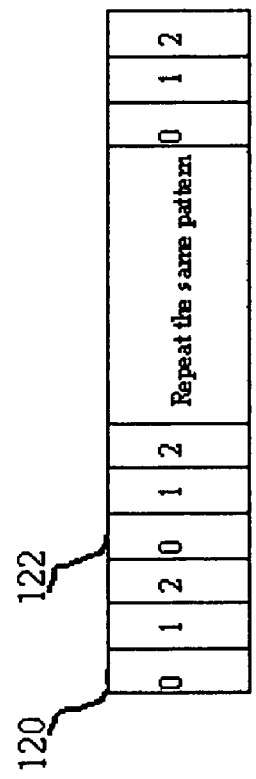

FIG. 1A is a cell configuration in spatial domain. FIG. 1B shows a narrow band assignment for preamble transmission in frequency domain corresponding to a drawing 110 in FIG. 1A. In FIG. 1B, a drawing 120 depicts a spectrum divided into narrow bands with reuse pattern 3 when a preamble is transmitted. The narrow bands are arranged into groups and each group has three non-overlapping narrow bands. The preamble signals sent by the BTS at the center cell, cell 0, occupy all the narrow bands marked with 0, denoted as segment 0. The preamble signals sent by the BTS in one of the three adjacent cells, cell 1, occupy all the narrow bands marked with 1, denoted as segment 1. This is also true for cell 2. In this case, a receiver module in the wireless station tuned to the center frequency can receive the signals from all BTS in the three adjacent cells.

In a multi-cell wireless communication system, the preambles broadcasted by the BTS in each cell carry a unique PN sequence. By calculating autocorrelation of the receiving signal, a wireless station can reliably detect the presence of a preamble when there is little interference with the receiving signal. However, if the receiving signal of the wireless station is impaired by interference, the autocorrelation method is no longer a reliable way to detect preambles.

Figure 2A:
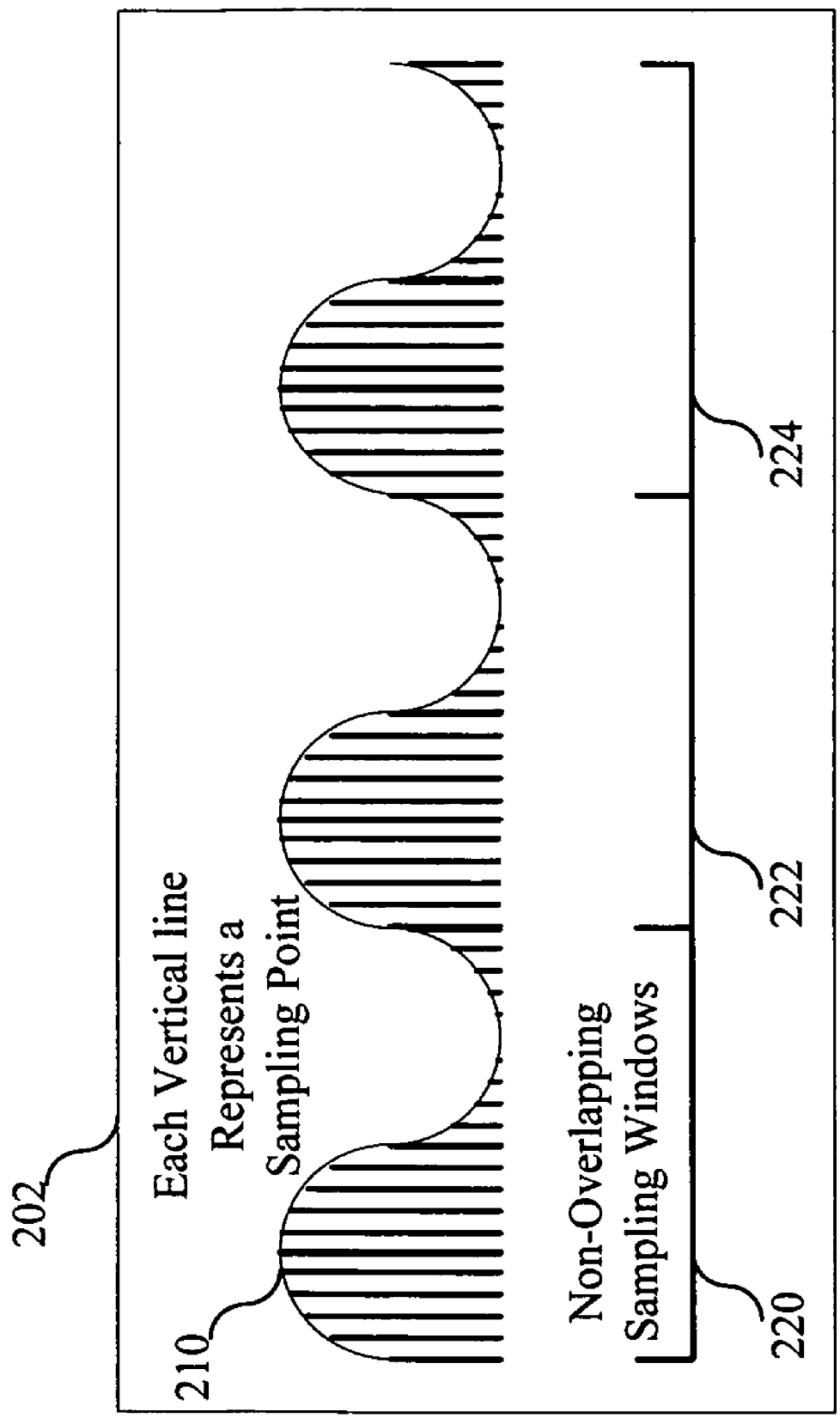
FIGS. 2A and 2B are examples of grouping sampling points into sampling windows.
Figure 2B:
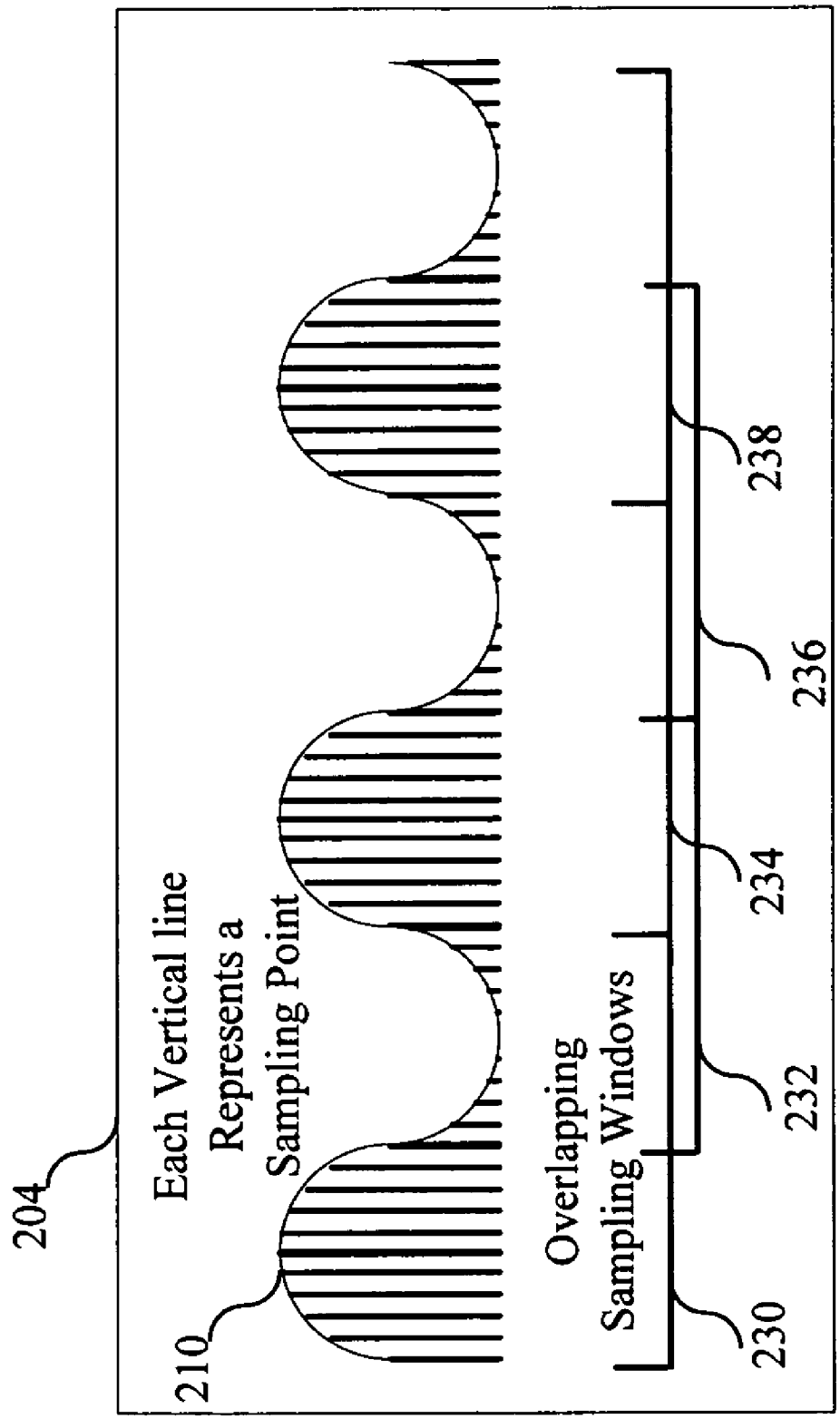

The time domain signal in the receiving period is sampled by the sampler module in the receiver chain. The sampling points in the receiving period are further subdivided into subgroups, each of which is defined as a sampling window with L sampling points. The sampling windows can be overlapped with each other. FIGS. 2A and 2B show examples of the grouping of the sampling points into sampling windows. Each vertical line 210 represents a sampling point. FIG. 2A shows non-overlapping sampling windows 220, 222, and 224. FIG. 2B shows overlapping sampling windows 230, 232, 234, 236 and 238.

Figure 3:
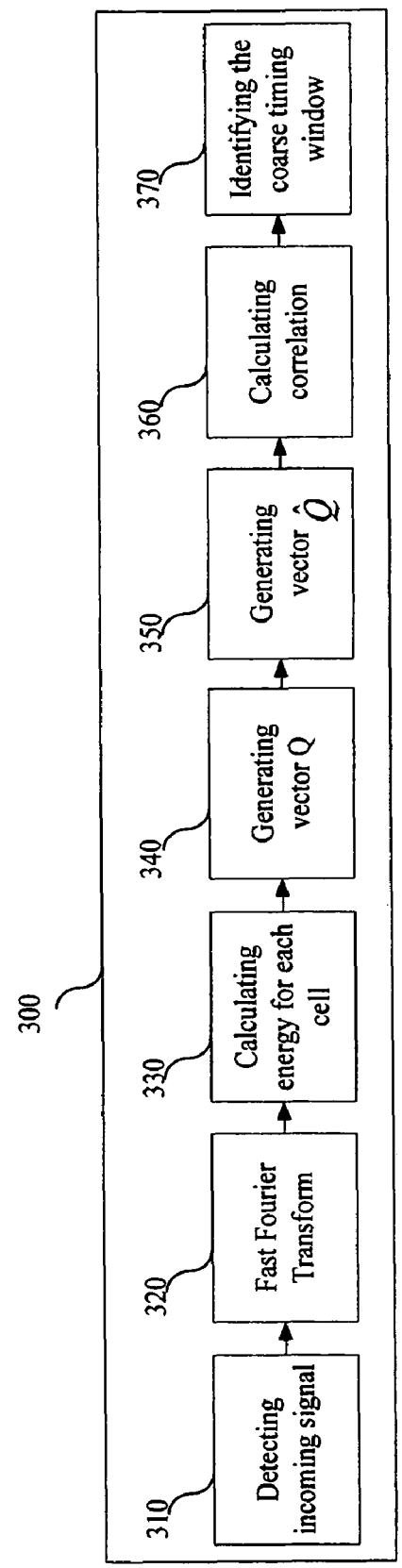
FIG. 3 is a flow diagram illustrating a preamble detection method according to an embodiment.

FIG. 3 is a flow diagram of the disclosed preamble detection method. The following procedure is applicable to every sampling window shown in FIGS. 2A and 2B.

In step 310, a receiver module of a wireless station first detects the carrier frequency of a receiving signal. If the carrier frequency offsets of the receiving signal is within a predetermined range, for example, 16 ppm (part per million), the preamble detection module is activated.

In step 320, an L-Point Fast Fourier Transform operation is used to transform the L sampling points in the sampling window into a frequency domain vector with L elements. Each element in the frequency domain vector represents a narrow band in the frequency domain.

The frequency domain vector R with L elements is represented by the following: $R=FFT(r)=[R(1), R(2), \ldots, R(L)]$, where r is the vector of L sampling points in the sampling window. The frequency domain vector covers the radio spectrum, allocated to the wireless communication system, which is shared by three adjacent cells. During the period of preamble transmission, each element in the frequency domain vector represents one narrow band and is allocated to cell 0, cell 1, and cell 2 in sequence. In other words, every third element of the frequency domain vector is allocated to the preamble of one specific cell. However, during data transmission, the data traffic occupies the whole bandwidth.

In step 330, the energy in the sampling window of each segment is calculate as follows:

$$E^{(j)} \sum_{n=0}^{\lfloor (L-j-1)/3 \rfloor} |R(3n+j+1)|^2,$$

where j is the segment number and $j \in \{0,1,2\}$, $E^{(j)}$ is the total energy in segment j, and $\lfloor \ldots \rfloor$ denotes the floor operation of the enclosed value.

Let $N_{sg}$ be the segment number that has the highest energy, ie. $E^{(N_{sg})} \geq E^{(j)}$, where $j \in \{0,1,2\}$ and $j \neq N_{sg}$.

The frequency domain vector of the segment with the highest energy is then denoted as $R_{sg}=[R(i+1), R(3+i+1), \ldots, R(3 \times \lfloor (L-i-1)/3 \rfloor + i + 1)]$, where $i=N_{sg}$ and $R_{sg}$ is a subset of vector R.

In step 340, a new vector Q is generated to reduce the channel effect on the detected signal by the following equation, $$Q = [R*(i+1)R(3+i+1), R*(3+i+1)R(6+i+1), \ldots ,$$
$$R*(3 \times (\lfloor (L-i-1)/3 \rfloor - 1) + i + 1)R(3 \times \lfloor (L-i-1)/3 \rfloor + i + 1)],$$

where operator (.)* denotes conjugate transpose of the enclosed vector. Q is the dot product of the conjugate of the vector $R_{sg}$ and the shifted vector of $R_{sg}$.

Assuming that the wireless communication system defines a set of M predetermined PN codes with the same length, denoted as $N_{PN}$, the wireless station in the wireless communication system creates a list of M pre-generated modified PN codes of length $N_{PN}-1$. The modified PN code is defined as the dot product of the predetermined PN code with the shifted version of the same predetermined PN code.

For example, if the PN code is $c=[c(1), c(2), \ldots, c(N_{PN})]$, then the modified predetermined PN code is $\hat{c}=[c(1)c(2), c(2)c(3), \ldots, c(N_{PN}-1)c(N_{PN})]$, where $N_{PN}$, the length, is the number of the binary bits (1 or -1), in the predetermined PN code.

In step 350, in order to calculate the correlation between the frequency domain vector and the modified PN code, a bit mask is further applied to the Q vector to produce a vector with the same length as the modified predetermined PN code. The bit mask has the same length as vector Q, and it consists of a sequence of 0's followed by $N_{PN}-1$ 1s and then followed by a sequence of 0's. The default bit mask has $N_{PN}-1$ 1s in the middle of the bit mask.

A new vector $\hat{Q}$ is obtained after the completion of the following two operations: Taking Boolean AND operation between the bit mask and the vector Q and removing a predetermined number of elements, also known as guard bands, from both ends of the vector generated by the AND operation.

In order to take into account all possible carrier frequency offsets, a set of bit masks is generated to create a set of vectors $\hat{Q}$, with each vector $\hat{Q}$ corresponding to one carrier frequency offset value. Each bit mask is the result of shifting the default bit mask by a certain number of units of sub-carrier spacing. If the carrier frequency offset of the receiving signal is in the range of $[-a, a]$ sub-carrier spacing, where a is an integer, the bit mask is shifted in the range of $[-b, +b]$ sub-carrier spacing, where b is an integer and $b=\lceil a/3 \rceil$, where $\lceil \ldots \rceil$ denotes the ceiling operation of the enclosed value. In other words, the default bit mask is shifted to the left or right by at most b position. As a result, $2b+1$ $\hat{Q}$ vectors are generated and each is associated with one carrier frequency offset value.

In step 360, a correlation vector S is obtained by calculating the correlation between each pair of the vectors $\hat{Q}$ and $\hat{c}$, shown in the following equation: $S^{(k)}=\hat{Q}(\hat{c})^T$, where operator $(.)^T$ denotes conjugate transpose of the enclosed vector. Each element $S^{(k)}$ in the correlation vector is a scalar and $k \in \{0, 1, \ldots, (2b+1) \times M - 1\}$.

Figure 4:
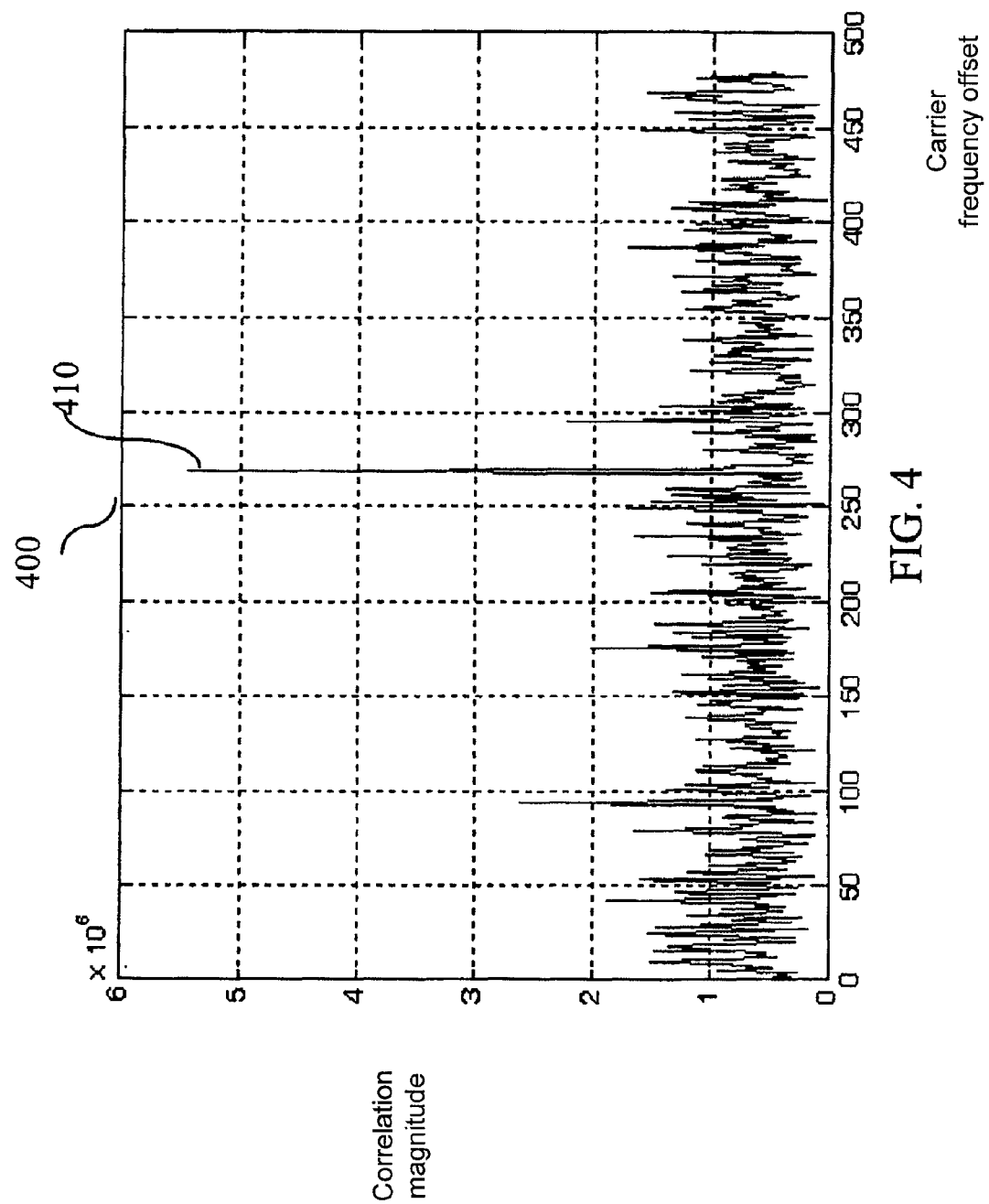
FIG. 4 is a diagram shows a correlation results for the preamble detection.

Whether a preamble is present in the receiving signal can be determined by comparing the highest value of the correlation result $S^{(k)}$ with the predetermined threshold, such as the average of the correlation values. If there exits an $S^{(k)}$ that exceeds the predetermined threshold, a preamble is present in the sampling window and thus the preamble is detected and the integer part of the carrier frequency offset is identified. FIG. 4 is a diagram illustrating the correlation results. The peak 410 in the diagram is the indication of the presence of a preamble.

The integer part of the carrier frequency offset is determined by the following equation: carrier frequency offset=$3N_{offset}+N_{sg}-N_{sg}^{(c)}$, where $N_{offset}$ is the number of units of sub-carrier spacing; $N_{sg}$ is the segment number; $N_{sg}^{(c)}$ is the segment number that the BTS of the cell sends the PN code c, with $N_{sg}^{(c)} \in \{0,1,2\}$. If the carrier frequency offsets are in [−6, 6] sub-carrier spacing, $N_{offset} \in \{-2,-1,0,1,2\}$.

In step 370, the preamble detection module continues to exam every sampling window and identifies the highest $S^{(k)}$ among sampling windows. The sampling window with the highest $S^{(k)}$ is identified as the coarse timing position of the preamble.

The techniques described herein disclose a method and system for detecting a preamble reliably in the presence of interference caused by multiple cells reusing the same frequency in a multi-cell communication system.

After receiving a signal in the receiving period, the method first identifies the segment with the highest energy, among the cells sharing the same center frequency, and generates a frequency domain vector for the segment. It then takes the dot operation on the frequency domain vector to reduce the channel effect. Subsequently, the correlation between the frequency domain vector and the modified PN code is calculated.

By examining the outcome of correlation operation, the numerical operations of the method conclude whether a preamble is presents in the receiving signals of the receiving period. The numerical operations of the method also determine the integer part of the frequency offset and coarse timing position of the preamble if it is present in the receiving signal. Since the present method includes shift, product and correlation operations, the method is also known as Shift-Product-Correlation (SPC).

The above description is by way of example only.

What is claimed is:

1. A method for detecting a preamble in a multi-cell communication system, the method comprising:
   at a wireless communication device, receiving a signal transmitted over a frequency band assigned to one or more cells in the multi-cell communication system, wherein the frequency band is divided into two or more narrow band segments in each of which is transmitted a unique pseudonoise sequence from a plurality of unique pseudonoise sequences for a corresponding cell;
   sampling the signal in the time domain using a sampling window of predetermined size to produce a predetermined number of samples;
   applying a Fast Fourier Transform to the predetermined number of samples to obtain a first frequency domain vector, wherein each element of the first frequency domain vector represents one of the narrow band segments;
   calculating an energy associated with each narrow band segment based on the first frequency domain vector in order to identify a narrow band segment with a highest energy;
   generating a second frequency domain vector using elements of the first frequency domain vector associated with the narrow band segment with the highest energy;
   generating one or more bit masks;
   generating one or more third frequency domain vectors from the second frequency domain vector by applying the one or more bit masks to the second frequency domain vector;
   generating a correlation vector by correlating one or more of the plurality of unique pseudonoise sequences with the one or more third frequency domain vectors;
   comparing one or more elements in the correlation vector with a predetermined threshold to determine that the preamble is present in the signal when at least one element in the correlation vector exceeds the predetermined threshold; and
   detecting the preamble when it is determined to be present in the signal based on the comparing.

2. The method of claim 1, wherein each narrow band segment is separated according to a corresponding carrier frequency offset value, and wherein generating the one or more bit masks comprises generating a bit mask for each narrowband segment by shifting a predetermined bit mask by a value corresponding to each corresponding carrier frequency offset value to generate the one or more third frequency domain vectors that are each associated with a corresponding carrier frequency offset value.

3. The method of claim 1, wherein sampling comprises sampling the signal using a plurality of non-overlapping or overlapping sampling windows to produce corresponding subgroups of sampled signals.

4. The method of claim 1, further comprising generating a fourth frequency domain vector comprising:
   computing a conjugate-transpose of the second frequency domain vector;
   shifting the second frequency domain vector by predetermined amount; and
   computing a dot product of the conjugate-transpose of the second frequency domain vector and the shifted second frequency domain vector to produce the fourth frequency domain vector, and wherein generating one or more third frequency domain vectors comprises by applying one or more bit masks to the fourth frequency domain vector.

5. The method of claim 4, wherein generating the one or more third frequency domain vectors comprises applying the one or more bit masks based on a corresponding carrier frequency offset, and wherein generating the one or more bit masks comprises generating each bit mask such that each bit mask has a same length as the fourth frequency domain vector.

6. The method of claim 5, wherein generating the one or more bit masks comprises generating a sequence of 1's of a predetermined length in the middle and a sequence of zeros at each end.

7. The method of claim 6, wherein generating the one or more bit masks comprises generating the one or more bit masks by shifting the one or more bit masks by a predetermined number of units of sub-carrier spacing.

8. The method of claim 4, wherein the generating one or more third frequency domain vectors includes computing a Boolean AND operation between the one or more bit masks and the fourth frequency domain vector.

9. The method of claim 8, wherein generating one or more third frequency domain vectors further includes removing a predetermined number of elements corresponding to guard bands, from both ends of the vector generated by the Boolean AND operation between the bit mask and the fourth frequency domain vector.

10. The method of claim 1, wherein receiving comprises receiving the signal transmitted using two or more of the plurality of unique pseudonoise sequences that are generated as a arithmetic shift-product of a pseudonoise code and a shifted version of the pseudonoise code to produce a plurality of unique shift-product pseudonoise codes.

11. The method of claim 1, further comprising
detecting the presence of the received signal;
determining whether a carrier frequency offset associated with the received signal is within a predetermined range; and
in response to determining that the carrier frequency offset is within a predetermined range, initiating detection of the preamble.

12. The method of claim 1, wherein generating the correlation vector comprises computing a vector product of the one or more third frequency domain vectors and a conjugate-transpose of one or more unique pseudonoise sequences.

13. The method of claim 1, wherein comparing comprises comparing one or more elements in the correlation vector with a predetermined threshold to determine that the preamble is present in the sampling window when at least one element in the correlation vector exceeds the predetermined threshold.

14. The method of claim 2, wherein each carrier frequency offset value corresponds to a number of subcarriers, and generating the one or more bit masks comprises generating the bit mask for each narrowband segment by shifting the predetermined bit mask by a value corresponding to the number of subcarriers for the carrier frequency offset value for that narrow band segment.

15. The method of claim 3, wherein applying comprises applying a Fast Fourier Transform to samples from each of the plurality of sampling windows to obtain a plurality of first frequency domain vectors; and
obtaining a plurality of correlation vectors associated with the plurality of sampling windows;
identifying a highest scalar component from among the plurality of correlation vectors; and
identifying a coarse preamble timing position based on a sampling window with the highest scalar component.

16. The method of claim 10, wherein correlating comprises correlating individual ones of the plurality of unique shift-product pseudonoise codes with the one or more third frequency domain vectors to obtain the correlation vector.

* * * * *